(12) United States Patent
Frank et al.

(10) Patent No.: US 7,575,274 B2
(45) Date of Patent: Aug. 18, 2009

(54) TRIGGERING DEVICE

(75) Inventors: Harald Frank, Marktzeuln (DE); Josef Storath, Forchheim (DE); Uwe Albrecht, Nuremberg (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/002,795

(22) Filed: Dec. 18, 2007

(65) Prior Publication Data

US 2008/0211273 A1 Sep. 4, 2008

(51) Int. Cl.
*B60N 2/42* (2006.01)
(52) U.S. Cl. .................. 297/216.12; 297/216.1; 297/391; 297/408; 297/409; 297/410
(58) Field of Classification Search ......... 297/216.12, 297/216.1, 391, 408–410
See application file for complete search history.

(56) References Cited

U.S. PATENT DOCUMENTS

| | | | |
|---|---|---|---|
| 5,110,185 A * | 5/1992 | Schmutz et al. | 297/410 |
| 5,403,037 A * | 4/1995 | Fohl | 280/806 |
| 5,405,180 A * | 4/1995 | Fohl | 297/478 |
| 5,458,396 A * | 10/1995 | Rost | 297/216.12 |
| 5,927,804 A * | 7/1999 | Cuevas | 297/216.12 |
| 6,113,185 A * | 9/2000 | Yamaguchi et al. | 297/216.1 |
| 6,213,548 B1 | 4/2001 | Van Wynsberghe et al. | |
| 6,478,373 B1 | 11/2002 | Hake et al. | |
| 6,568,184 B2 * | 5/2003 | Blackburn et al. | 60/636 |
| 6,805,404 B1 * | 10/2004 | Breed | 297/216.12 |
| 6,908,149 B1 * | 6/2005 | Yamaguchi et al. | 297/216.1 |
| 2004/0134705 A1 * | 7/2004 | Nadeau et al. | 180/274 |
| 2005/0116457 A1 | 6/2005 | Becker et al. | |
| 2006/0218918 A1 * | 10/2006 | Hirooka et al. | 60/512 |

FOREIGN PATENT DOCUMENTS

| | | |
|---|---|---|
| DE | 19650321 | 6/1998 |
| DE | 10001329 | 7/2001 |
| DE | 10030545 | 1/2002 |
| EP | 1186786 | 3/2002 |

OTHER PUBLICATIONS

International Search Report mailed Dec. 21, 2006.

* cited by examiner

*Primary Examiner*—Laurie K Cranmer
(74) *Attorney, Agent, or Firm*—Douglas D. Fekete

(57) ABSTRACT

The present invention relates to a an actuation unit having a triggering device for the moving of a headrest into a predetermined position, with the triggering device comprising a pyrotechnic gas generator and a triggering member which is movable from a blocking position into a release position.

6 Claims, 1 Drawing Sheet

TRIGGERING DEVICE

TECHNICAL FIELD OF INVENTION

The present invention relates to a triggering device for an actuation unit for the moving of a headrest into a predetermined position.

BACKGROUND OF INVENTION

In modern motor vehicles, the headrests of at least the front seats are each provided with an actuation unit which serves to move the headrest in the event of an accident into a position in which the vehicle occupant sitting in the seat is protected as much as possible from injuries to the cervical spine. The actuation unit of the headrest is triggered in this process by a triggering device which receives a corresponding signal from an electronic control unit in the event of an accident.

Triggering devices are known from the prior art which use electromagnetic actuation systems with whose assistance the headrest is moved into a predetermined position. Apparatuses of this type have the disadvantage that they react comparatively slowly and that therefore a movement of the headrest in good time is not always ensured on an accident at high speed. In addition, an energy supply is required for the electromagnetic system, which has an unfavorable effect on the required installation space and on the manufacturing costs.

There is a need to provide an actuation unit having a triggering device that is capable of bringing about the desired movement of the headrest as fast and as reliably as possible and can nevertheless be produced as cost-favorably as possible.

SUMMARY OF THE INVENTION

A preferred embodiment of the invention is an actuation unit for the moving of a head rest into a predetermined position, including a triggering device that has a pyrotechnic gas generator and a triggering member which is movable from a blocking position into a release position. The pyrotechnic gas generator is ignited in the event of an accident and brings about a movement of the triggering member from a blocking position into a release position. In the blocking position, the headrest can be held, for example, against a bias generated by a spring. After the ignition of the pyrotechnic gas generator, the triggering member is moved into the release position and the headrest is thereby unlatched so that it is moved into the predetermined position by the bias, which ensures a maximum protection of the person sitting in the vehicle seat.

Pyrotechnic gas generators are used, for example, for the inflation of airbags on an impact of the vehicle and have the advantage of a very short reaction time. In addition, they are comparatively cost-favorable and space-saving so that the use of the pyrotechnic gas generator instead of an electromagnetic triggering apparatus ensures a short reaction time, on the one hand, but also contributes to a lowering of costs, on the other hand.

In accordance with a preferred embodiment of the invention, the actuation unit includes a triggering apparatus having a piston displaceable by an ignition of the pyrotechnic gas generator. With the aid of such a piston, the triggering member can be moved in a simple manner from the blocking position into the release position.

The piston is preferably at least partly inside a pressure chamber of the gas generator in a position of rest and is displaceable in a direction out of the pressure chamber by an ignition of the gas generator. An arrangement of this type is characterized by particular simplicity since the pressure generated by the ignition of the pyrotechnic gas generator is directly passed on to the piston disposed partly in the pressure chamber and is transformed into a movement of the piston. This arrangement additionally has the advantage of being very space-saving so that the total triggering device can advantageously be accommodated in the headrest holder.

In accordance with an advantageous further development of the invention, the piston has a throughgoing bore whose one end opens into the pressure chamber. Some of the gas generated can escape through this bore so that the high pressure built up after the ignition of the pyrotechnic gas generator can be restricted. The maximum level of the pressure to be reached can be controlled by a suitable choice of the diameter of the bore extending through the piston.

The other end of the bore is preferably covered in a state of rest of the piston and is no longer covered after a displacement of the piston by an ignition of the gas generator. No gas can thus initially escape from the pressure chamber and the total pressure created is used to effect a displacement of the piston. If this displacement has been brought about, the bore is exposed so that the gas can now escape from the pressure chamber. It is thereby prevented that too high a pressure is built up in the chamber which can possibly result in damage to the headrest and the parts surrounding it or can even result in an injury to the vehicle occupants.

The cover of the bore formed in the piston can be formed by the triggering member which is movable from a blocking position into a release position. A lever element alone or a plurality of lever elements together can, for example, form the triggering member and transmit a displacement of the piston to the headrest. This triggering member can now not only be used for the transmission of the movement from the piston to the headrest, but also for the covering of the bore formed in the piston. In the blocking position, the triggering member covers the bore so that initially a sufficiently high pressure can build up to set a movement of the piston, and thus of the triggering member, into motion. When the triggering member has been moved into the release position, the purpose to be brought about by the triggering of the gas generator is achieved and the overpressure created inside the pressure chamber can now be bled by release of the bore.

In accordance with an advantageous embodiment of the invention, the gas generator is seated in a housing body and a recess in the housing body closed by a cover forms a pressure chamber. In this manner, a pressure chamber closed in a gastight manner can be formed with a comparatively low effort and its walls can also withstand high pressure.

The pressure chamber is preferably bounded at one side by a cover which has an opening which is provided with a guide for the piston and through which the piston extends. The cover thus not only closes the pressure chamber, but also forms a holder for the piston.

The cover is preferably fastened to a housing body in which the pressure chamber is formed. A fastening by means of an ultrasonic welding process is particularly advantageous since, in this manner, a gastight connection of the cover to the housing body is achieved which withstands high pressures. The cover closes the pressure chamber and can, as already mentioned above, simultaneously serve as a holder for a moving piston extending through an opening in the cover.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 2:
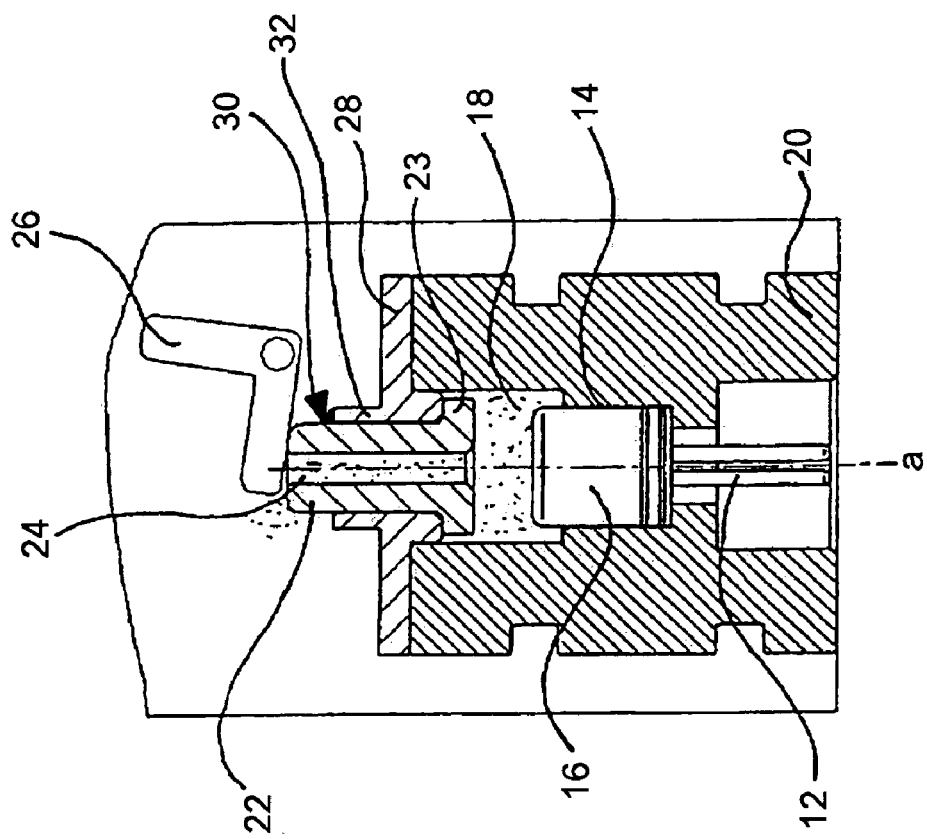
FIG. 2 is a cross-section through the triggering device of FIG. 1 whose triggering member is located in a release position.
Figure 1:
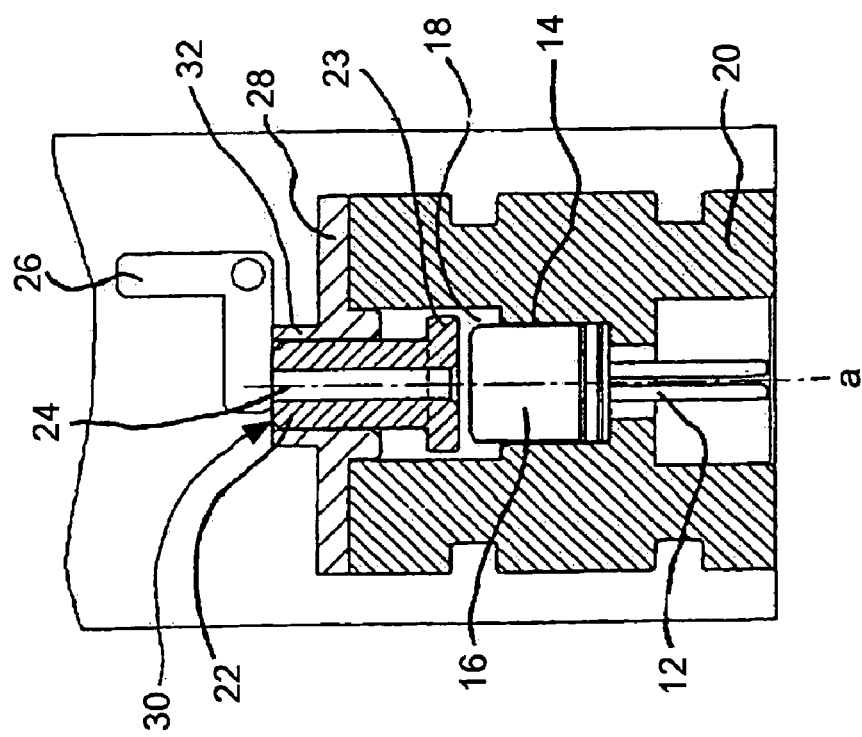
FIG. 1 is a cross-section through a triggering device whose triggering member is located in a blocking position

In accordance with a preferred embodiment of this invention, referring to FIGS. 1 and 2, which show a cross-section through a triggering device for an actuation unit for moving a headrest or rollover protection apparatus not shown in the Figures. The triggering apparatus shown comprises a pyrotechnic gas generator seated in a housing body 20 and a triggering member 26 in the form of a lever element which is in active connection with the gas generator via a movable piston 22, as will be explained in the following. In FIG. 1, the triggering device is shown before the ignition of the gas generator and in FIG. 2 after the ignition of the gas generator.

The housing body 20 is substantially cylindrical and rotationally symmetrical with respect to a symmetry axis "a" of the total triggering device. The pyrotechnic gas generator comprises an igniter 12 which is likewise seated symmetrically to the symmetry axis a in the housing body 20 and which is ignited by a corresponding signal from an electronic control unit not shown in the Figures. This ignition results in the combustion of a propelling charge 14 which is not visible in the Figures and which is arranged in a space which is formed by a cap 16 seated on the igniter. The cap 16 approximately has the shape of a cylinder open at the bottom and is preferably made of steel. On the combustion of the propelling charge 14, gases are released which allow the pressure in the space bounded by the cap 16 to increase. When a specific pressure has been reached, the cap 16 is destroyed and a throughflow opening provided for this purpose opens and the gas created by the combustion of the propelling charge 14 can escape into a pressure chamber 18 substantially disposed above the cap 16. This pressure chamber 18 likewise has the same symmetry axis "a" as the igniter 12 and the cap 16 and is made as a cylindrical recess in an upper region of the cylindrical housing body 20.

A cover 28 is seated at the top on the housing body 20; it closes the pressure chamber 18 and is fastened to the housing body 20, for example, with the aid of an ultrasonic welding process. A circular opening 30 is formed centrally in the cover 28 and its diameter is smaller than that of the recess forming the pressure chamber 18 in the housing body 20. The rims of this opening 30 form a tubular guide 32 for an axially displaceable piston 22 whose external diameter corresponds to the internal diameter of the opening 30. The piston 22 is substantially cylindrical, with its longitudinal axis coinciding with the symmetry axis "a" of the pressure chamber 18 and of the housing body 20 and being widened in the manner of a flange at its lower side.

In the state shown in FIG. 1 before the ignition of the gas generator, the piston 22 closes flush with the guide 32 at its upper side and projects into the pressure chamber 18 at its lower side. The already mentioned flange-like widened section 23 provided at the bottom at the piston prevents—as can be recognized in FIG. 2—the piston 22 from being pressed completely out of the pressure chamber 18 through the opening 30 in the cover 28 after the ignition of the gas generator.

The piston 22 has a bore 24 which extends in the longitudinal direction over the total length of the piston through a symmetry axis "a" and which is closed by a lever element 26 at the upper side in the state shown in FIG. 1.

After the ignition of the igniter 12 and the following combustion of the propelling charge 14, the pressure under the cap 16 initially increases, as already mentioned above. This finally results in a destruction of the cap so that the gas created flows into the pressure chamber 18 and an overpressure is built up there. The piston 22 is displaced upwardly by this pressure until its flange-like widened section 23 abuts the guide 32 in the cover 28 from below. The lever element 26 is moved by the movement of the piston 22 from the blocking position shown in FIG. 1 into the release position shown in FIG. 2. At the same time, the bore 24 in the piston 22 is exposed at its upper side by the movement of the lever element 26 so that the gas can escape from the pressure chamber 18 through the bore 24. The headrest in active connection with the lever element 26 is already located in the desired predetermined position at this time.

The present invention is naturally not only applicable to a headrest, but also to a rollover bar or the like.

While this invention has been described in terms of the preferred embodiments thereof, it is not intended to be so limited, but rather only to the extent set forth in the claims that follow.

We claim:

1. An actuation unit for moving a head rest in a vehicle seat and comprising a triggering device, said triggering device comprising:

a housing body defining a chamber, a pyrotechnic gas generator within said housing body and adapted for producing a pressurized gas within said chamber, a piston extending through said housing body and having an inner end and an outer end, said piston being movable in response to said pressurized gas within said chamber, and a triggering member adapted to engage the outer end of the piston and movable from a blocking position to a release position in response to movement of said piston by said pressurized gas, wherein said piston comprises a bore extending from said inner end to said outer end for releasing said pressurized gas.

2. An actuation unit for moving the head rest in a vehicle seat of claim 1, wherein said triggering member includes a lever engaging said outer end of said piston and pivotable between said blocking position and said release position, wherein said lever covers said bore in said blocking position and uncovers said bore in said released position to discharge said pressurized gas from said chamber.

3. An actuation unit for moving the head rest in a vehicle seat of claim 1, wherein said piston is at least partly inside said chamber in said blocking position and is displaceable in the direction out of said chamber in response to said pressurized gas.

4. An actuation unit for moving the head rest in a vehicle seat of claim 1, wherein said chamber is bounded at one side by a cover which has an opening which is provided with a guide for said piston and through which said piston extends.

5. An actuation unit for moving the head rest in a vehicle seat of claim 4, wherein said inner end of said piston comprises a flange that engages said cover to limit movement of said piston in response to said pressurized gas.

6. An actuation unit for moving the head rest in a vehicle seat of claim 5, wherein said cover is fastened to said housing body by means of an ultrasonic welding process.

* * * * *